INVENTORS:
DOUGLAS E. BROUSSARD
DEAN P. HEMPHILL

A. H. McCarthy
THEIR AGENT

INVENTORS:
DOUGLAS E. BROUSSARD
DEAN P. HEMPHILL
BY: A. H. McCarthy
THEIR AGENT

INVENTORS:
DOUGLAS E. BROUSSARD
DEAN P. HEMPHILL
BY:
THEIR AGENT

United States Patent Office 3,546,889
Patented Dec. 15, 1970

3,546,889
CONSTRUCTION OF MULTIPLE PIPE RISERS TO OFFSHORE PLATFORMS
Dean P. Hemphill and Douglas E. Broussard, Houston, Tex., assignors to Shell Oil Company, New York, N.Y., a corporation of Delaware
Continuation-in-part of application Ser. No. 641,961, May 29, 1967, now Patent No. 3,466,882, dated Sept. 16, 1969. This application June 13, 1969, Ser. No. 833,057
Int. Cl. F16l 1/00; E02b 17/00
U.S. Cl. 61—72.3
7 Claims

ABSTRACT OF THE DISCLOSURE

A method and apparatus for connecting a plurality of underwater pipelines lying along the floor of a body of water to an offshore platform in which the end of the pipelines are bent upwardly to form a pipeline "riser" and subsequently connected to the platform. Each pipeline is bent to a desired curvature around a guide of "shoe" having a sufficient radius to prevent buckling the pipeline.

CROSS-REFERENCE TO RELATED APPLICATIONS

This application is a continuation-in-part of U.S. application Ser. No. 641,961, filed on May 29, 1967, now Pat. No. 3,466,882.

BACKGROUND OF THE INVENTION

Field of the invention

This invention relates to underwater flowlines, and more particularly to a method and apparatus for connecting an underwater flowline to an offshore "platform."

Description of the prior art

The development of offshore oil and gas wells frequently necessitates the use of offshore installations or so-called "platforms." These installations are used, for example, for drilling and subsequently for producing a well or wells. Accordingly, it is often desirable to provide one or more flowlines from a platform to a remote point, for example to shore or to another platform. The flowlines may serve many purposes, the most common being to carry off the output of oil or gas from a well. Since the flowline (also referred to herein as pipeline) lays in a substantially horizontal position along the floor of the body of water in which the platform is located, a problem arises in establishing fluid communication between the flowline and the surface of the platform which is above the surface of the body of water. It will be thus apparent that either the flowline must be bent from its horizontal position on the ocean floor to a vertical position extending to the upper surface of the platform or a separate vertical extension must be installed and connected to the flowline on the ocean floor. The vertical portion is generally referred to as the flowline "riser."

The present practice for installing the "riser" is to provide a vertical flowline or pipeline segment along the side of the platform which extends to the floor of the body of water and is connected to the underwater flowline by divers. However, this is a generally cumbersome and expensive operation, particularly in relatively deep water where the divers' effectiveness is severely impaired.

In some cases, it is known to first connect the "riser" to the flowline and lower the assembly down a leg of the platform while simultaneously laying the flowline from a barge proceeding away from the platform. However, this procedure also has drawbacks in that the lowering and laying operation must be carefully programmed to prevent damage to the pipeline and/or riser. In addition, the method is only applicable where a pipeline is laid away from a platform and cannot be readily and easily employed where a pipeline approaches a platform.

It sometimes happens that a number of underwater pipelines, such as flowlines from individual ocean-floor wells, gathering lines from other structures, control lines, oil trunklines, gas trunklines and the like must initiate or terminate at an offshore structure or platform. When a plurality of pipelines are connected, the potential damage from ships, anchors, construction, debris and the action of storms is accordingly increased. Furthermore, the riser portions of pipelines, vulnerable in themselves, also present problems in construction and in attachment to the platform. In view of this, it is becoming increasingly desirable, where a plurality of pipelines are connected to a platform, to group some or all of these pipelines in their attachment to the structure.

SUMMARY OF THE INVENTION

In summary, the subject invention provides a method and apparatus for connecting a plurality of pipelines to an offshore structure or platform in which each of the pipelines are bent upwardly to form upstanding "risers." More specifically, a platform sub-structure has positioned adjacent thereto a curved pipeline bending guide having downwardly and outwardly facing grooves, each groove being adapted to receive one of said pipelines. The pipelines are pulled into the grooves by suitable pulling means so that the pipelines are bent to a curvature conforming to the guide, thereby forming an upstanding riser portion. The bending guide may be a unitary structure incorporating a plurality of grooves, or it may be constructed of segments or modules, each module being formed with a groove to handle a single flowline.

In view of the problems encountered with conventional riser installations, it is a primary object of this invention to provide a method of installing a flowline riser to an offshore platform which eliminates the need for making an underwater connection.

Another object is to install a flowline riser to a platform in which the flowline may be laid either toward or away from the platform.

A further object is to provide a method of installing risers in which the underwater flowline and the riser may be formed of one continuous pipeline.

A still further object is to bend the underwater flowline to provide an upstanding portion which serves as a riser.

And yet a further object is to bend the flowline to form a riser while maintaining the radius of curvature above a predetermined minimum so as to prevent buckling of the pipeline.

Still another object is to provide an offshore platform with a flowline adapted to lay along the floor of a body of water and bent to a desired curvature to form a riser extending to said platform.

Another object is to provide apparatus for accommodating several pipelines, each of which is bent to provide an upstanding riser portion.

It often happens that the need arises for the addition of a riser to a platform at some time after the initial pipelines have been installed. It is usually not possible to anticipate the exact diameter (or the number) of such additional risers at the time the platform is built.

Therefore, a further object of this invention is to provide for the later addition of modules for bending unanticipated risers. The radius and cross section of such a module need not be the same as those already in place, so long as its frame is designed to utilize existing guide and locking means.

DESCRIPTION OF THE PREFERRED EMBODIMENT

Figure 1:
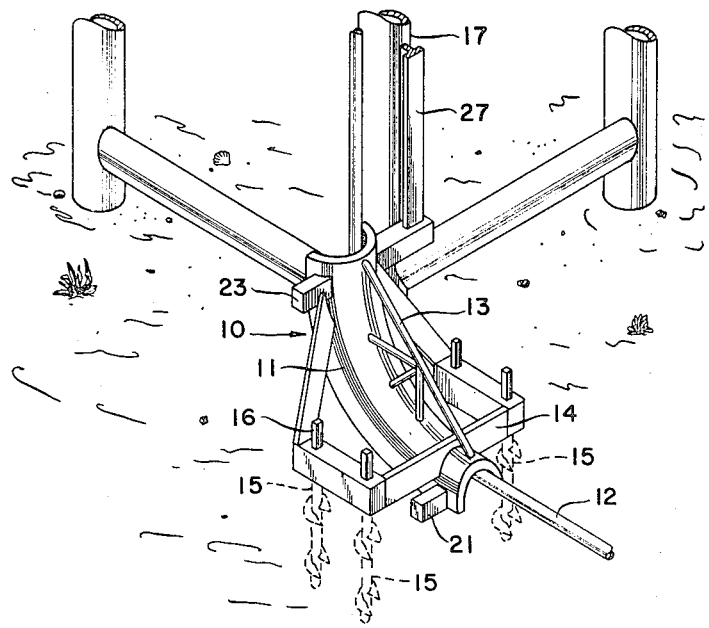
FIG. 1 is a perspective view of the substructure of an offshore platform with a flowline riser in place.

Referring now to FIG. 1, the device is shown with a pipeline installed and is indicated generally by the numeral 10. The bending guide or "shoe" 10 includes a curvature limiting fixture 11 in the form of half of a tubular segment split longitudinally and bent approximately 90° to form a cradle for receiving a pipeline 12. Suitable bracing 13 may be employed along the back of the fixture 11 to prevent the device from bending during operation. Also included in the bending guide 10 and connected to the curvature limiting fixture 11 is an anchoring assembly 14 having downwardly depending augers 15 which are adapted to be driven into the floor of the body of water to fixedly secure the bending guide 10 to the floor of a body of water. The means for driving the augers 15 may take any suitable form and may be operated remotely from the surface of the water or by divers. As shown, drive shafts 16, which are drivably connected to the augers 15, may be driven with a suitable power head (not shown) and may be manipulated by divers into position or lowered from the surface onto the drive shafts 16 and then actuated either electrically, manually or hydraulically to drive the augers and anchor the bending shoe 10. After anchoring, the power head may be disconnected and removed to the surface.

Although one preferred form of anchoring is shown, it will be readily apparent that the device may be suitably anchored into place in another manner. For example, it may be attached directly to the platform 17 or other forms of anchoring to the floor of the body of water may be employed. For example, inverted cup-shaped members may be substituted for the augers 15. By evacuating the interior of the cup-shaped members, they will be anchored to the sea floor by virtue of the suction created.

Figure 2:
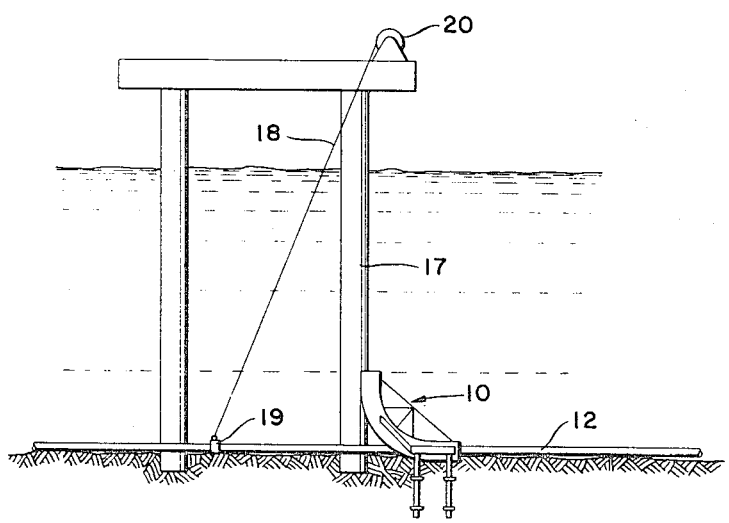
FIG. 2 is an elevation view of the platform showing an underwater flowline prior to being bent around a bending guide to form a riser.
Figure 3:
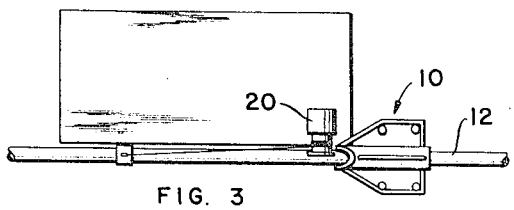
FIG. 3 is a plan view of FIG. 2.

Referring now to FIGS. 2 through 5, the sequence of installing the pipeline 12 is disclosed. Referring to FIGS. 2 and 3, the pipeline 12 is shown installed adjacent to the platform 17, having been so positioned from a suitable pipe-laying barge (not shown) prior to installing the guide 10. After the pipeline 12 has been laid, drawline 18 is suitably secured to the pipeline 12 by a clamp 19. The drawline extends to the platform surface or an auxiliary construction vessel such as the pipe-laying barge, where it is attached to a suitable hoisting mechanism, for example a winch 20. The pipe guide 10 is then lowered into position over the pipeline 12 where it is suitably anchored so that the lower portion of the curvature limiting fixture 11 is cradled over the pipeline 12. The guide 10 may be positioned by divers operating on the sea floor, by guide lines, or by lowering the guide down a leg of the platform 17 along a rail 27 (FIG. 1) secured to the platform leg 17. While not essential to the invention, it is preferably to employ latch means 21 as shown in FIG. 1 at the lower end of the curvature limiting fixture 11 to positively hold the pipeline 12 in the curvature limiting fixture 11. The latch 21 may be self-actuating, that is it may be tripped by the pipeline 12 or it may be remotely operated by a mechanical underwater manipulator or operated by divers after the bending shoe is in place.

After the bending shoe 10 is positioned, winch 20 is actuated to hoist drawline 18, thereby lifting the pipeline 12 into contact with the bending guide 10. The curvature limiting fixture acts as a fulcrum for the pipeline 12 and the pipeline 12 will conform to and bend around the curvature limiting fixture 11. Therefore, it will be apparent that the curvature limiting fixture 11 will dictate the radius of curvature to prevent the pipeline from collapsing or buckling. The minimum radius of curvature will, of course, vary dependent on the size and type of pipe used to make up flowline 12.

Figure 5:
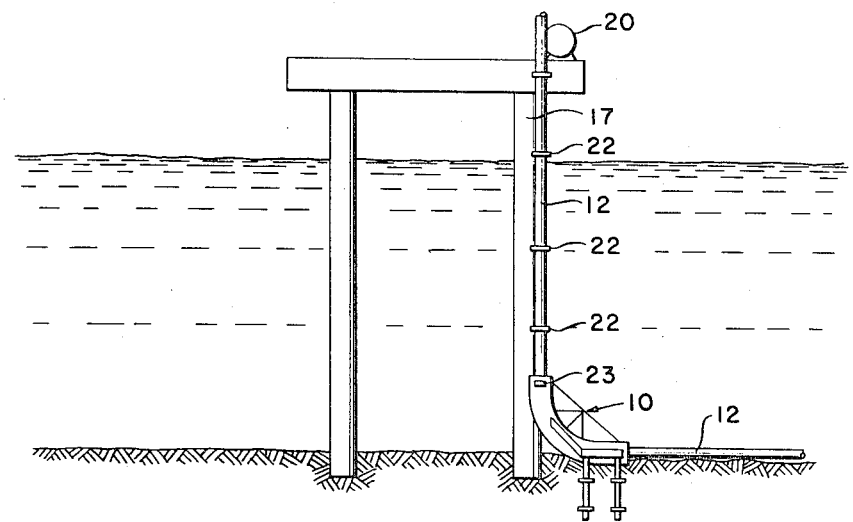
FIG. 5 is an elevational view showing the flowline in its final installed position.
Figure 4:
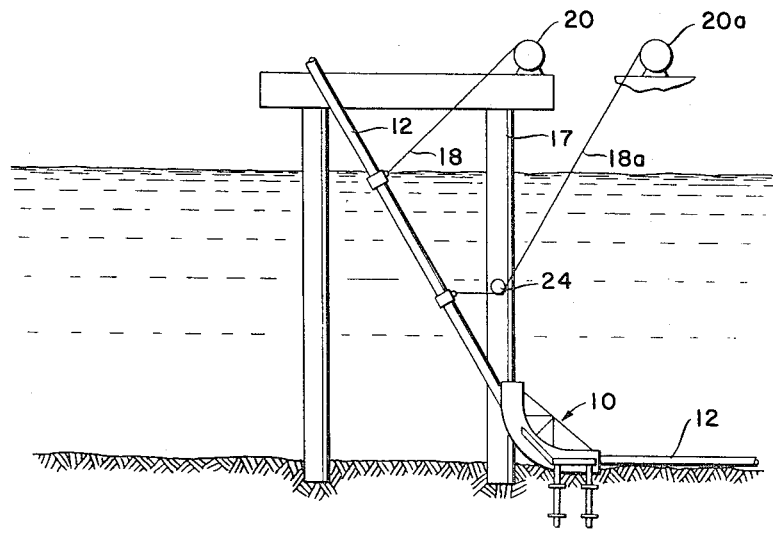
FIG. 4 is an elevational view similar to FIG. 3 showing a flowline being bent into place to form a riser.

The pipeline 12 is hoisted by means of drawline 18 as shown in FIG. 4 until it reaches a nearly vertical position as shown in FIG. 5. When the final position of the pipeline 12 is reached, it is attached to the platform 17 by means of clamps 22 located at conveniently spaced points along the platform structure. In addition, it is preferable to employ a latch 23 near the upper end of the bending guide 10 as best shown in FIG. 1. The construction and operation of this latch 23 is similar to that of latch 21 as discussed above.

It may be necessary in some cases, where the length of pipe extending beyond the bending guide 10 (i.e., the unsupported portion being hoisted) is great enough, to employ an additional drawline 18a to assist in hoisting pipeline 12 into position (see FIG. 4). The additional drawline is driven by a hoist 20a and is preferably pulled about a pulley 24 secured to a leg of the platform 17 to keep the pulling force more perpendicular to the pipeline 12. When an additional hoisting drawline is employed, drawline 18 will be secured to the pipeline 12 nearer the end of the pipeline 12 so that the lifting force is more evenly distributed along the pipeline 12. It is to be understood, however, that guide 10 need not be directly connected to platform 17; it may "operatively engage" platform 17 in such a manner that it is positioned adjacent to the legs of platform 17 and that the foregoing operations are carried out from platform 17.

The vertical or "riser" portion of the pipeline 12 extending to the upper surface of the platform 17 may be connected to processing equipment handling the output of a well drilled through one of the legs of the platform 17 (not shown) or may be connected directly to a well or to another pipeline leading to the platform 17. Although the "riser" is shown in a vertical position, it should be understood that the riser may be installed at any angle from the horizontal without departing from the spirit of the invention. For example, the flowline could be bent to a 45° angle and then joined with another section to provide communication with the upper surface of the platform 17. In addition, the riser need not extend to the surface. It may, for example, extend only a short distance past the upper end of the pipe bending guide 10. Pipe lengths could subsequently be added to the end of the pipeline 12 to form a riser extending to the depth desired or to the surface.

Figure 6:
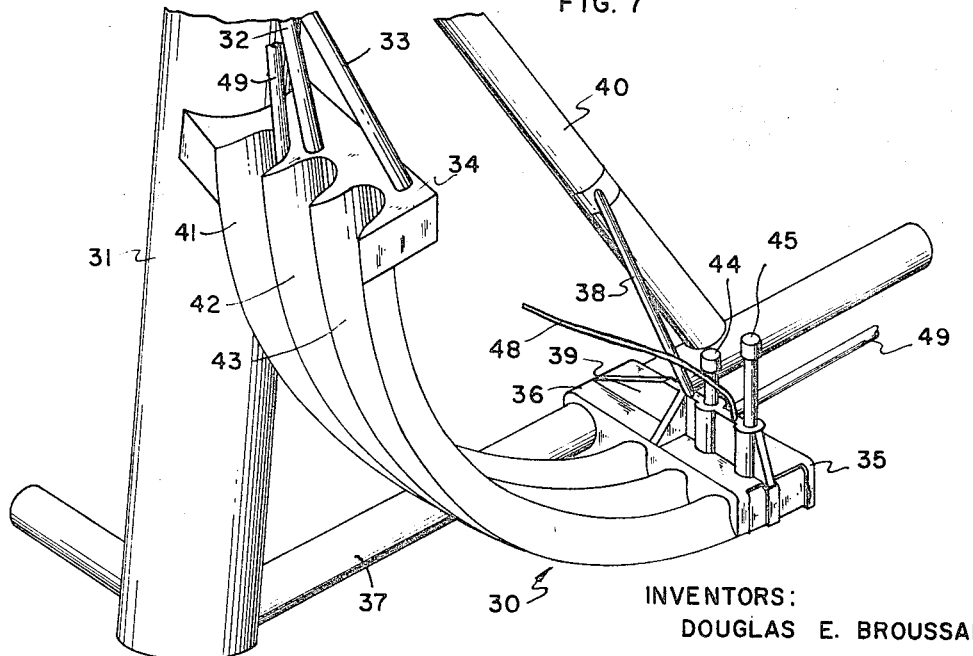
FIG. 6 is a perspective view of the substructure of an offshore platform showing a bending guide for accommodating a plurality of pipelines.

Referring to FIG. 6, there is shown a modified pipeline bending guide or "shoe" for accommodating a plurality of pipelines and indicated generally by the numeral 30. As shown, the guide 30 is attached at its upper end to a leg 31 of an offshore platform by welding or other suitable means. Suitable diagonal braces 32 and 33 may also be employed between upper surface 34 of the guide 30 which is provided with a connector block 35 including a lateral extension 36 adapted to surround cross-brace 37 of the platform to thereby fixedly locate the lower end of the guide 30. In addition, a reinforcing stringer 38 is disposed between a reinforcing web 39 on the upper surface of connector block 35 and a diagonal brace 40 of the platform substructure. The string 38 helps to resist the twisting moment induced in the structure when a pipeline is bent around the guide 30 as will be hereinafter described.

As used herein, the phrase platform sub-structure is intended to cover the arrangement of leg 31 and braces 37 and 40 as shown or any other known structure for supporting an offshore installation or platform. Hence, the particular arrangement of the platform to which the guide 30 is attached is not intended to form a part of this invention since the guide may be used in conjunction with various types of platforms.

In addition, it is contemplated that the guide 30 may be alternatively fastened directly to the ocean floor in the manner described with reference to the guide 10 shown in FIG. 1 rather than to a platform substructure.

Referring again to FIG. 6, the guide 30 includes an outwardly and downwardly facing curved pipe-engaging surface comprised of grooves 41, 42 and 43, each groove being of a sufficient size to receive and laterally restrain one pipeline similar to the manner in which a single pipeline is received in the guide 10 disclosed in FIGS. 1–5. Although grooves 41, 42 and 43 are shown as smooth continuous curves in cross-section, it is expected that one skilled in the art may construct the guide 30 with grooves of other cross-sectional shapes so long as the groove is sufficiently large to accommodate the size of pipeline being used. For example, the grooves may be substantially V-shaped in cross-section.

The multiple grooves 41, 42 and 43 provide the capacity to handle three pipelines which are to be connected to a platform. The pipelines may be all installed at one time or some grooves may be left empty to provide the capability of accommodating future pipelines. Furthermore, although three grooves are shown, the guide 30 may be provided with any number of grooves in accordance with the invention depending on the desired capability of a particular installation.

Figure 8:
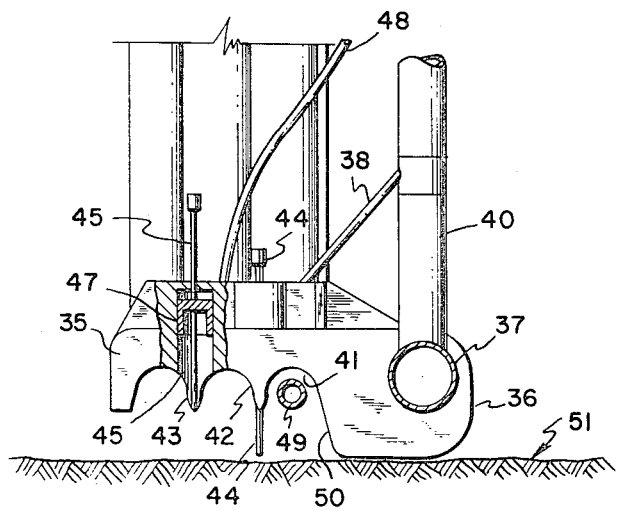
FIG. 8 is an end view of the bending guide of FIG. 6.

As best shown in FIG. 8, the guide 30 may be provided with selectively actuatable guide assemblies such as pins or gates 44 and 45 to assist in guiding the pipelines into the proper groove and assure that a pipeline does not enter an already occupied groove.

The pin or gate 44 is carried within the connector block 35 and arranged to be selectively extended downwardly therefrom between grooves 41 and 42 to provide a physical barrier between the grooves. The pin or gate 45 is similarly arranged to be extended between the grooves 42 and 43. As shown in partial section, the pin 45 is provided with a piston 46, intermediate the ends thereof and received with a hydraulic chamber 47. Hydraulic fluid for actuating the piston 46 and the pin 45 is supplied through the hydraulic hose 48. Pin or gate 44 is similarly provided with a piston and chamber (not shown). Alternatively, the pins or gates 44 and 45 may be manually actuated by deep-sea divers operating on the ocean floor.

In operaton, a pipeline 49 is laid alongside and past the guide 30 in a manner described above in reference to the embodiment illustrated in FIG. 2. The pipeline 49 is then drawn under the guide 30 and against shoulder 50 so that it will align with the groove 41. Thereafter, the portion of pipeline 49 extending past the guide 30 is hoisted to bend the pipeline around the guide in the same manner as shown in sequence FIGS. 2-5. During hoisting, pipeline 49 will conform to the groove 41, finally terminating in the position shown in FIG. 6. The pin or gate 44 would be in the retracted or upward position during the above operation in order to permit the pipeline 49 to enter the groove 41.

After pipeline 49 is installed, the pin or gate 44 (if employed) is lowered as shown in FIG. 8 to prevent a subsequent pipeline from entering groove 41 and overlapping the pipeline 49. The length of pin or gate 44 is preferably long enough so that when extended it will either terminate at or near ocean floor 51 or protrude into the floor (not shown). Thus, it will be seen that a second pipeline (not shown) will be stopped by the pin or gate 44 when it is moved under guide 30 and will, therefore, be directed into groove 42. Thereafter, gate 45 is lowered so that a third pipeline (not shown) will be directed into groove 43.

Figure 7:
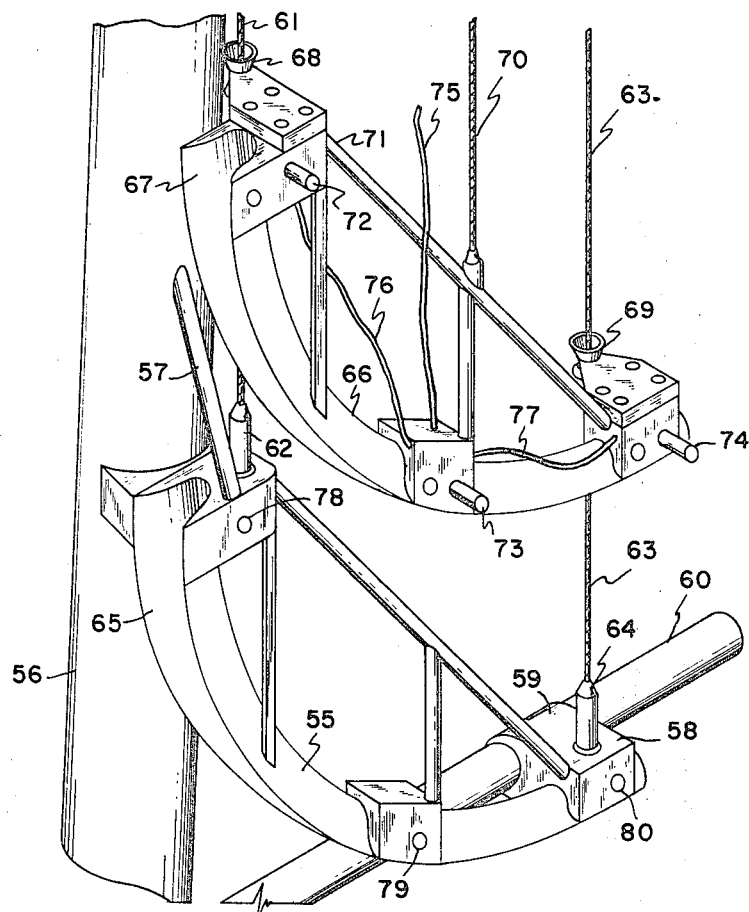
FIG. 7 is a perspective view similar to FIG. 6 in which the bending guide is made up of a segmented or modular construction.

The bending guide or "shoe" may also be of a segmented or modular construction and this embodiment is shown in FIG. 7. A first segment of module 55 is rigidly attached to a platform substructure similar to the attachment of guide 30 in the FIG. 6 embodiment. Again referring to FIG. 7, the module 55 is attached at its upper end to a leg 56 of an off-shore platform and reinforced by a diagonal brace 57. The lower end of the module 55 terminates in a connector box 58 which includes a lateral extension 59 adapted to surround a cross-brace 60 of the platform substructure.

A guideline 61 is secured to the upper end of module 55 by means of a guidepost 62. A similar guideline 63 is attached to the connector box 58 by a guidepost 64. Both guidelines extend to the water surface and serve as a means to guide additional modules into place as will be hereinafter described.

The module 55 includes a single pipe-receiving groove 65 which corresponds to the groove 41 of the FIG. 6 embodiment. A second module or segment 66 including a single pipe-receiving groove 67 is shown being lowered down the guideline 61 and 63. The groove 67 of the module 66 corresponds to the groove 42 of the FIG. 6 embodiment. The module 66 includes tubular guides 68 and 69 adapted to surround the guidelines 61 and 63, respectively. The tubular guides 68 and 69 are offset from the module 66 so that when the tubular guides 68 and 69 are landed over the guidepost 62 and 64 the groove 67 of the module 66 will be immediately adjacent to the groove 65 of the module 55. The module 66 is preferably restrained during lowering by means of a wire 70 attached to a tubular bracing member 71 of the module 66. Alternatively, the module 66 may be lowered by a string of drill pipe (not shown) in place of the wireline 70.

The module 66 also includes suitable means for locking the module 66 to the module 55 in the form of a hydraulically actuated locking arrangement, such as clamps or pins 72, 73 and 74. The pins are actuated by hydraulic fluids supplied through a hydraulic hose 75 which extends to the water surface. Hydraulic fluid is also supplied to the locking pin 72 via hose 76 and to the pin 74 via hose 77. When module 66 is in place adjacent the module 55 the pins 72, 73 and 74 are actuated so that they are moved into locking engagement in bores 78, 79 and 80 in the module 55, thus restraining the two modules from relative vertical movement. Alternatively, the locking arrangement may be actuated manually by a deep sea diver operating on the ocean floor.

It will be seen that additional modules similar to the module 66 may be lowered down the guidelines 61 and 63 to form a resultant composite bending guide or "shoe" similar to the guide shown in the FIG. 6 embodiment. The only difference in construction, in additional modules over module 66, would be that the tubular guides 68 and 69, adapted to surround the guidelines 61 and 63, would have to be further offset with respect to the module so that when it is lowered into place it will be positioned adjacent to the previously lowered module.

It will be understood that one objective of our invention is to provide for the addition of modules at any time. That is, additional modules, designed for a particular riser diameter, may be installed as they are needed, provided that they be adapted to utilize the existing guideline and locking means.

Once the desired number of modules are installed, the operation of the composite bending guide is essentially the same as that described with reference to FIG. 6. If desired, the modular construction of FIG. 7 may also incorporate pins or gates (not shwon) similar to and having the same function as the gates 44 and 45 of the FIG. 6 embodiment.

In lieu of or in addition to the guidelines 61 and 63, the module 66 and subsequent modules could be guided into position along rails secured to the platform substructure or leg 56. For example, the modules could be adapted to ride down a leg-mounted rail similar to the rail 27 of the FIG. 1 embodiment.

Existing single-pipeline bending guides as disclosed in FIGS. 1-4 may also be converted to multiple-pipeline capability by underwater divers adding latching means and guide means to an existing bending guide so that subsequent modules such as module 66 can be added on to form a composite structure capable of handling a plurality of pipelines.

We claim as our invention:

1. An offshore installation positioned on a floor of a body of water and adapted to receive at least one of a plurality of pipelines having a major portion thereof lying along the floor of the body of water, said installation comprising:
   a platform substructure including leg means positioned on the floor of said body of water;
   curved pipeline bending guide means operatively engaging said substructure and having an outward and downward facing curved pipe-engaging surface, said surface having a plurality of longitudinally extending open-faced pipe-receiving grooves, each of said grooves being of a size sufficient to receive and laterally restrain one of said pipelines; and
   hoist means including drawline means attachable to at least one of said pipelines for pulling each of said pipelines directly into mating engagement with each of said respective grooves.

2. An apparatus as defined in claim 1 wherein said pipe receiving grooves are substantially parallel to one another.

3. An apparatus as defined in claim 1 wherein said curved bending guide means is comprised of a plurality of interconnecting individual segments, each of said segments having at least one of said grooves.

4. An apparatus as defined in claim 3 including selectively actuatable locking means carried by said segments for connecting said segment to an adjoining segment.

5. An apparatus as defined in claim 4 wherein one of said segments is rigidly attached to said platform substructure.

6. An apparatus as defined in claim 5 further including:
   guideline means connected to said attached segment and extending to the surface of said water; and
   guideline receiving means carried by the remainder of said segments adapted to cooperate with said guideline means whereby said guideline means is guided into position adjacent to said attached segment.

7. An apparatus as defined in claim 1 further including selectively extensible pin means carried by said curved bending guide means and arranged between said grooves to prevent a pipeline subsequently from entering a groove already occupied by a pipeline.

References Cited

UNITED STATES PATENTS 3,434,296   3/1969   Otteman et al. _____ 61—72.3

JACOB SHAPIRO, Primary Examiner

U.S. Cl. X.R.

61—46